United States Patent Office 3,187,015
Patented June 1, 1965

3,187,015
DEHYDRATION OF TRIMELLITIC ACID
Norman Henry Pearce, Hull, England, assignor to The Distillers Company Limited, Edinburgh, Scotland, a British company
No Drawing. Filed Oct. 23, 1962, Ser. No. 232,562
Claims priority, application Great Britain, Nov. 22, 1961, 41,697
2 Claims. (Cl. 260—346.3)

The present invention relates to the production of trimellitic anhydride.

According to the present invention the process for the production of trimellitic anhydride comprises heating trimellitic acid at a temperature not lower than 175° C. within a liquid reaction medium wherein the trimellitic acid is substantially insoluble and the trimellitic anhydride is soluble.

The liquid reaction medium employed in the process of the present invention is a substance or mixture of substances which is liquid at the temperature of the reaction, which is inert to trimellitic acid and its anhydride, in which trimetallic acid is substantially insoluble, and in which trimellitic anhydride is soluble. The liquid reaction medium preferably is one whose boiling point or minimum boiling point is not lower than 175° C., although liquids of lower boiling point may be used if the reaction is carried out under suitably increased pressure. The chemical nature of the liquid reaction medium is not important, provided the above requirements are fulfilled, but aliphatic, alicyclic and aromatic hydrocarbons and mixtures of such hydrocarbons are most suitable. A particularly useful liquid hydrocarbon medium is decahydronaphthalene, which boils at about 191° C. The reaction may conveniently take place at the reflux temperature of the medium under the conditions employed; the temperature of the reaction is not lower than 175° C., and is preferably not higher than the melting point of trimellitic acid. A preferred temperature range is 180° C. to 200° C.

The amount of liquid reaction medium is not critical, provided that the trimellitic acid is entirely within the liquid volume of the reaction medium. An upper limit to the amount of medium will be provided from economic considerations dependent on the solubility of the anhydride therein.

The process of the invention may suitably be carried out by mixing trimellitic acid with the liquid reaction medium and raising the temperature to the boiling point of the medium, if necessary with adjustment of the reaction pressure to ensure that the reflux temperature falls within the desired range. The reaction mixture is preferably well stirred during the reaction. Water evolved in the formation of the anhydride is taken off overhead, as an azeotrope with the reaction medium if such an azeotrope is formed. Any of the reaction medium which distils may be reparated from the water and returned to the reaction mixture. When no more water is evolved the reaction is complete and trimellitic anhydride is obtained as a solution in the hot reaction medium. Unconverted trimellitic acid, if any, remains undissolved, and the hot medium may be decanted from any residue.

Trimellitic anhydride may be recovered from solution in the medium by any suitable method, for example by crystallisation or extraction.

The invention may be operated either as a batch process or continuously, and the liquid reaction medium, after recovery of trimetallic anhydride therefrom, may be re-used in the process.

The invention is further illustrated by the following example.

*Example*

25 parts by weight of commercial trimellitic acid was added to 500 parts by weight of decahydronaphthalene in a heated reaction vessel equipped with an efficient stirrer, condenser and decanter head, the decahydronaphthalene being slightly under the reflux temperature when the trimellitic acid was added. The mixture was brought to reflux temperature and heated until water evolution ceased. (1 hour 10 minutes). Removal of the hot solution followed by cooling yielded 22.5 parts by weight of crystalline trimellitic anhydride, having a melting point of 162° C. and being 99.2% pure.

I claim:

1. The process for the production of trimellitic anhydride which comprises heating trimellitic acid at a temperature in the range of 180° to 200° C. within a liquid medium comprising decahydronaphthalene until substantially no further water is evolved and recovering the trimellitic anhydride from its solution in the decahydronaphthalene.

2. The process as claimed in claim 1 in which the heating is carried out at the reflux temperature of the decahydronaphthalene.

References Cited by the Examiner

UNITED STATES PATENTS

| | | | |
|---|---|---|---|
| 2,683,110 | 7/54 | Rousseau | 202—42 |
| 2,888,465 | 5/56 | Hodes | 260—346.3 |
| 3,098,095 | 7/63 | Knobloch et al. | 260—346.7 |

OTHER REFERENCES

Jordan: Technology of Solvents (1937), pages 211–13.

IRVING MARCUS, *Primary Examiner.*

NICHOLAS S. RIZZO, *Examiner.*